US006842878B1

(12) United States Patent
Johnson et al.

(10) Patent No.: US 6,842,878 B1
(45) Date of Patent: Jan. 11, 2005

(54) METHOD TO DOCUMENT RELATIONS BETWEEN OBJECTS USING A GRAPHICAL INTERFACE TREE COMPONENT

(75) Inventors: Peter John Johnson, Rochester, MN (US); Michael Donald Pfeifer, Dodge Center, MN (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 09/672,044

(22) Filed: Sep. 29, 2000

(51) Int. Cl.[7] .............................. G06F 3/00; G06F 17/30

(52) U.S. Cl. ........................ 715/853; 715/841; 715/854; 715/855; 715/968

(58) Field of Search ................................ 345/808, 810, 345/ 835, 841, 843, 846, 853, 854, 855, 856, 968; 707/100, 102, 103 R, 104.1, 10

(56) References Cited

U.S. PATENT DOCUMENTS

| 5,627,979 A | * | 5/1997 | Chang et al. ................ 345/763 |
| 6,108,004 A | * | 8/2000 | Medl ........................... 345/804 |
| 6,189,019 B1 | * | 2/2001 | Blumer et al. .............. 715/513 |
| 6,247,020 B1 | * | 6/2001 | Minard ..................... 707/104.1 |
| 6,282,547 B1 | * | 8/2001 | Hirsch ........................ 707/102 |
| 6,523,035 B1 | * | 2/2003 | Fleming et al. ................ 707/10 |

FOREIGN PATENT DOCUMENTS

JP          11-161531 A        6/1999

* cited by examiner

Primary Examiner—X. L. Bautista
(74) Attorney, Agent, or Firm—Christopher J. Lynt; Owen J. Gamon (57) ABSTRACT

Logical relationships between objects are displayed using a graphical interface tree component. In a data base application, by selecting and expanding a table node, user can see those views and indexes which are directly related to the table, but not contained within the table, i.e., where there is no physical connection, but there are logical connections (relations). With context menus, the user can make changes in place.

14 Claims, 9 Drawing Sheets

FIG. 1A (PRIOR ART)

| Name | Owner | Type |
|---|---|---|
| Categories | dbo | User |
| COMPONENTS | dbo | User |
| CustomerCustomerDemo | dbo | User |
| CustomerDemographics | dbo | User |
| Customers | dbo | User |
| dtproperties | dbo | System |
| Employees | dbo | User |
| Employees1 | dbo | User |
| EmployeeTerritories | dbo | User |
| Order Details | dbo | User |
| Orders | dbo | User |
| Products | dbo | User |
| Region | dbo | User |
| Shippers | dbo | User |
| Suppliers | dbo | User |
| sysallocations | dbo | System |
| syscolumns | dbo | System |
| syscomments | dbo | System |
| sysdepends | dbo | System |
| sysfilegroups | dbo | System |
| sysfiles | dbo | System |
| sysfiles1 | dbo | System |
| sysforeignkeys | dbo | System |
| sysfulltextcatalogs | dbo | System |

METHOD TO DOCUMENT RELATIONS BETWEEN OBJECTS USING A GRAPHICAL INTERFACE TREE COMPONENT

BACKGROUND OF THE INVENTION

1. Field of the Invention

The invention relates to the field of graphical interfaces, and in particular, to graphically displaying logical relationships between objects.

2. Background Information

Even the earliest computer system included a rudimentary mechanism that allowed it to receive input from its users. These mechanism are often called user interfaces. The user interfaces of early computers often employed lights and switches that allowed the computer system user to communicate with the computer system in the system's native language. While this form of communication was effective, its use was essentially limited to scientists and engineers who were trained to understand the particulars of the computer system. For this reason, computer system providers moved to user interfaces that provided for entry of textual commands. While these command-based user interfaces were easier to use than their predecessors, they still typically involved a large number of commands that were often difficult for non-technical individuals to understand and remember. The shortcomings of command-based user interfaces led to the introduction of graphical user interfaces, which are often referred to as GUIs. Instead of requiring the user to have in-depth knowledge of the computer system, graphical user interfaces allow the every day user to communicate with the computer system via a pointing device such as a mouse. To use the computer system to perform various tasks, the user simply "points and clicks" on various GUI items such as icons and taskbars. These icons and taskbars are user friendly ways of activating different programs on the computer.

Data is typically organized in files, grouped in directories. Directories may be grouped together in other directories. Sometimes directories are displayed as folder icons, and the hierarchy of files within directories, and directories within directories, is displayed as a tree structure.

Modern graphical interfaces, such as are used in Windows-based programs, and the like, give access to objects, such as files and directories, by grouping and displaying icons representing objects of similar types in various levels of containers in a tree structure. Although this type of display grouping is useful in many circumstances, there are many situations when the container relationships do not give the user any indication of other relationships that may exist among the objects.

For example, consider a critical table in a database which has 30 indexes and 100 views created over it. The container model allows the user to "drill" down to the table level only, which does not give the user a full appreciation of the relationships between the table and the indexes and views.

Figure 1A:
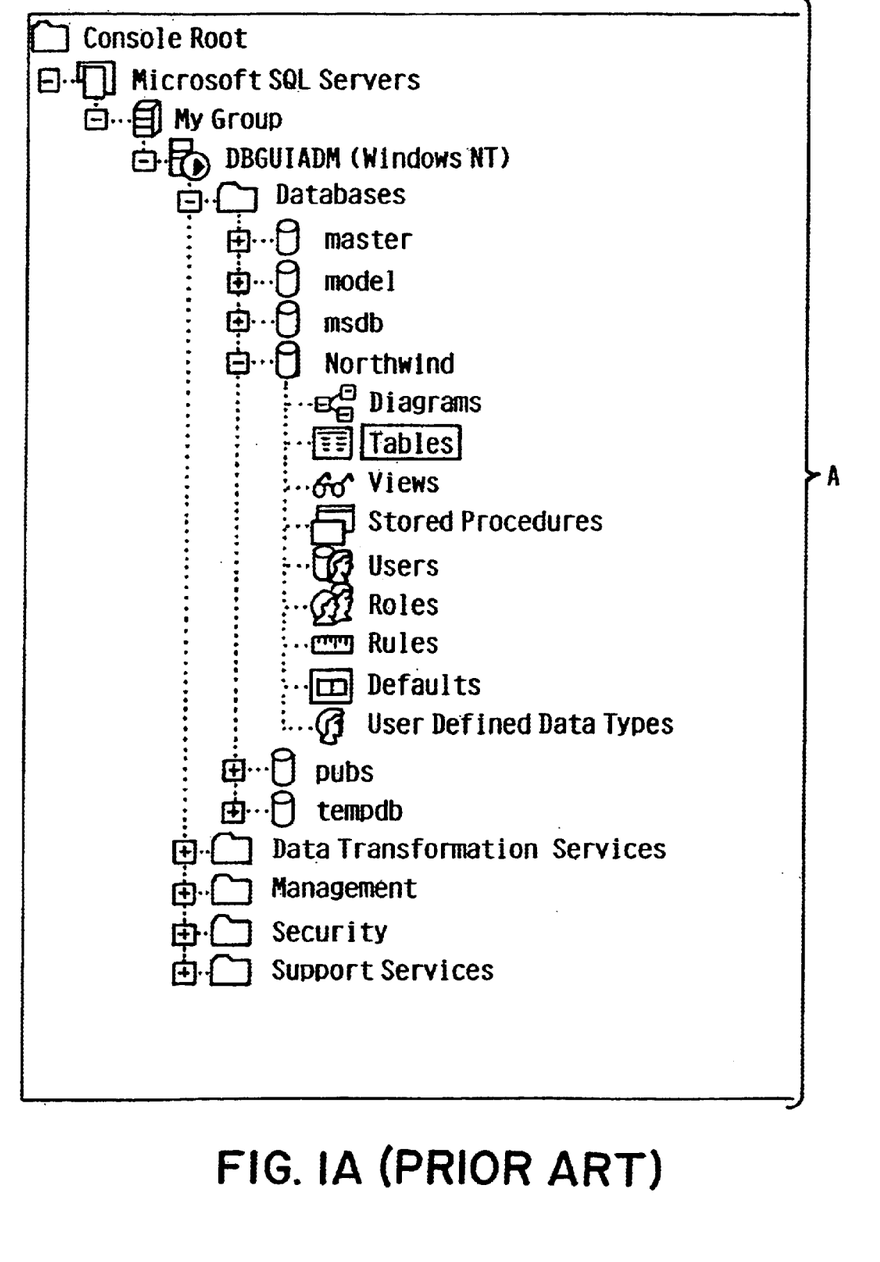
FIG. 1 illustrates a typical view of how data is grouped today in a known commercial product.
Figure 1B:
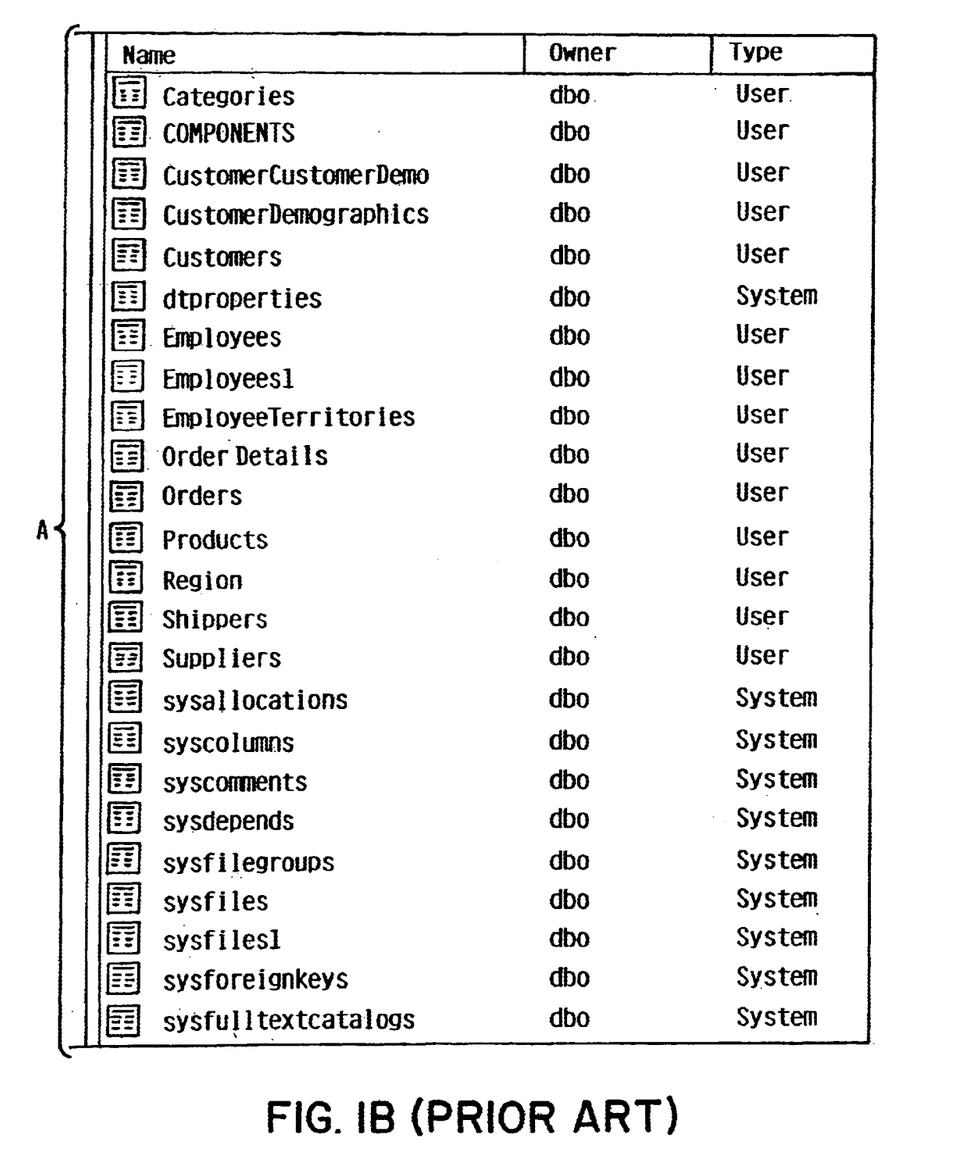

In the example shown in FIG. 1, there is a typical view of how data may be grouped today in the SQL 7.0 product from Microsoft. Although SQL 7.0 is used for the example, there may be other data base products which provide a similar graphical interface. In this example, when opening the table container, a list of tables is displayed, but with no visual cues showing how other objects relate to any particular table. That is, there are no visible cues about relationships between the particular table, and the indexes and views. This implementation in FIG. 1 shows only containers in the tree (on left) and uses another window (on right) to list the contents of the container.

However, when dealing with a complex database, for example, the relationships between objects are very difficult to remember and understand, but they are very important to consider when making updates or changes to the database.

Therefore, a new model which would allow the user to see those views and indexes which are directly related to the table, but not contained within the table, i.e., where there is no physical connection, but there are logical connections (relations), would overcome the above-mentioned problems and make the computer systems more user friendly.

SUMMARY OF THE INVENTION

It is, therefore, a principle object of this invention to provide a method of documenting relations between objects using a graphical interface tree component.

It is another object of the invention to provide a method that solves the above mentioned problems so that a user is able to see those views and indexes which are directly related to the table, but not contained within the table, i.e., where there is no physical connection, but there are logical connections (relations).

These and other objects of the present invention are accomplished by the method disclosed herein.

According to an aspect of the invention, a tree structure is used to reflect the other logical relationships, which in the exemplary embodiment are database relationships.

According to an aspect of the invention, applied to a data base application, a user can easily see those views and indexes which are directly related to the table, but not contained within the table, i.e., logically related to the table.

According to an aspect of the invention, a user can now see which objects are related to one another, and with context menus, can make changes in place.

These and other aspects of the invention will become apparent from the detailed description set forth below.

DETAILED DESCRIPTION OF THE PREFERRED EMBODIMENT(S)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

As described in the Background section, FIG. 1 shows a typical view of how data is grouped today in the SQL 7.0 product form Microsoft. In this example when opening the table container on the left, a list of tables is displayed on the right, but with no visual cues showing how other objects relate to any particular table. Only containers are shown in the tree in the left window and another window on the right is used to list the contents of the container. However, as noted earlier, when dealing with a complex database the relationships between objects are very difficult to remember and understand, but they are very important when making updates/changes to the database. When making changes to a database, having an understanding of how each of the parts of the database relate to each other is critical to making the change correctly.

In the FIG. 1 example, there are sets of containers that hold like objects. A problem which the invention is directed to overcoming, is that what is not shown is the relationship (s) between objects in one container and objects in another container. For example, the views have relationships to one or more tables, but that cannot be seen using the container way of presenting data. When a user clicks on a container in the tree on the left, e.g., the TABLES container, the objects of that type of group are displayed in another window on the right.

FIGS. 2 to 6 depict an exemplary embodiment of the invention in which a user can see which objects are related to one another and with context menus can make changes in place. That is, the logical relationships between each of the parts of the database are laid out in the tree. This new model allows the user to easily see those views and indexes which are directly related to the table, but not contained within the table. With the context menus, any change can be made and the tree refreshed in place with that change. For example, a user may decide that an index is necessary. Right-clicking on the table to display the context menu, then clicking on the properties for the table, and doing the required data entry, the index is created and then shows up in the index category.

The examples viewed sequentially from FIGS. 2–6 show how a user can find the logical relationships that exist between objects according to an exemplary embodiment of the invention. It will be understood by a person skilled in the art that these logical relationships may be accessed from the target application, e.g., a data base application, to be used for the graphical interface display according to the invention.

Figure 2:
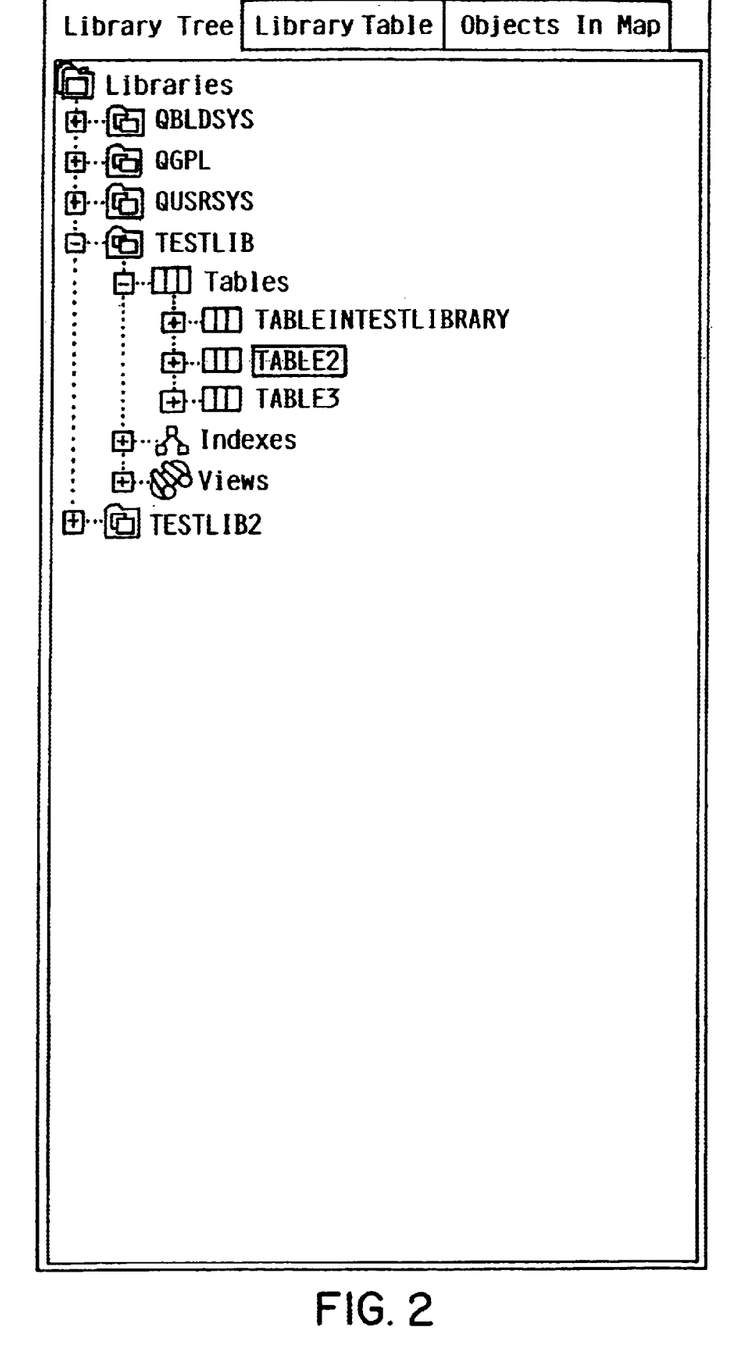
FIGS. 2–6 illustrate in sequence how a user can find the relationships that exist between objects, according to an exemplary embodiment of the invention.

When a user expands a container in the tree, e.g., the Tables container, the objects of that type of group are displayed in another area of the window below it. In FIG. 2, the Library Tree tab at the top of the window has been selected, and the Tables container in TESTLIB has been expanded to show that it has three table objects therein, and TABLE2 is selected (highlighted). The TESTLIB container also has an Indexes container and a Views container under it in the tree, which are not expanded in FIG. 2, but will be shown expanded in FIG. 6.

Figure 3:
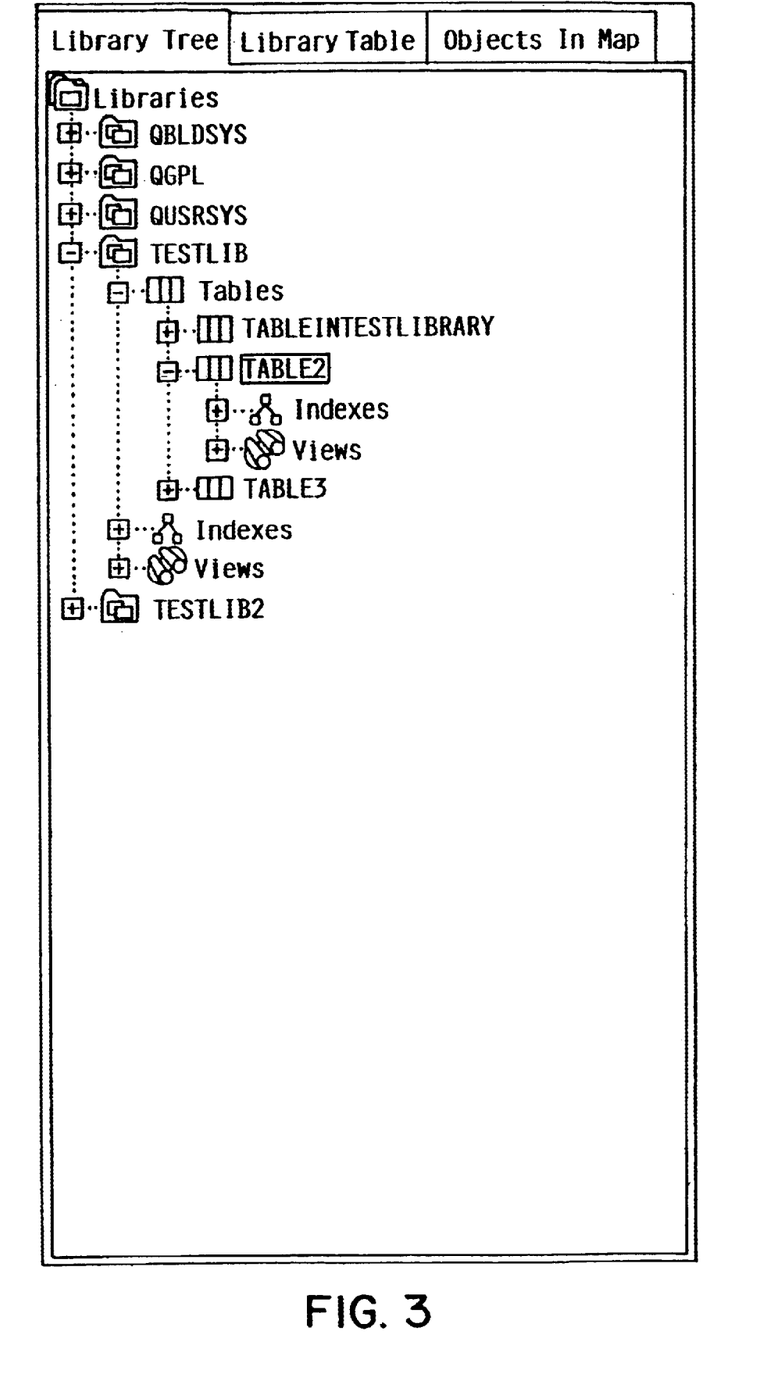

In FIG. 3, the TABLE2 object has been expanded by clicking on the "+" sign, and below it in the tree are two objects: Indexes and Views. These objects represent the logical relationship of indexes and views to the table. That is, they are not contained in TABEL2, but have logical relationships to TABLE2. This advantageous display of these relationships is not provided by the graphical interface in the SQL 7.0 product or other known products, described above.

Figure 4:
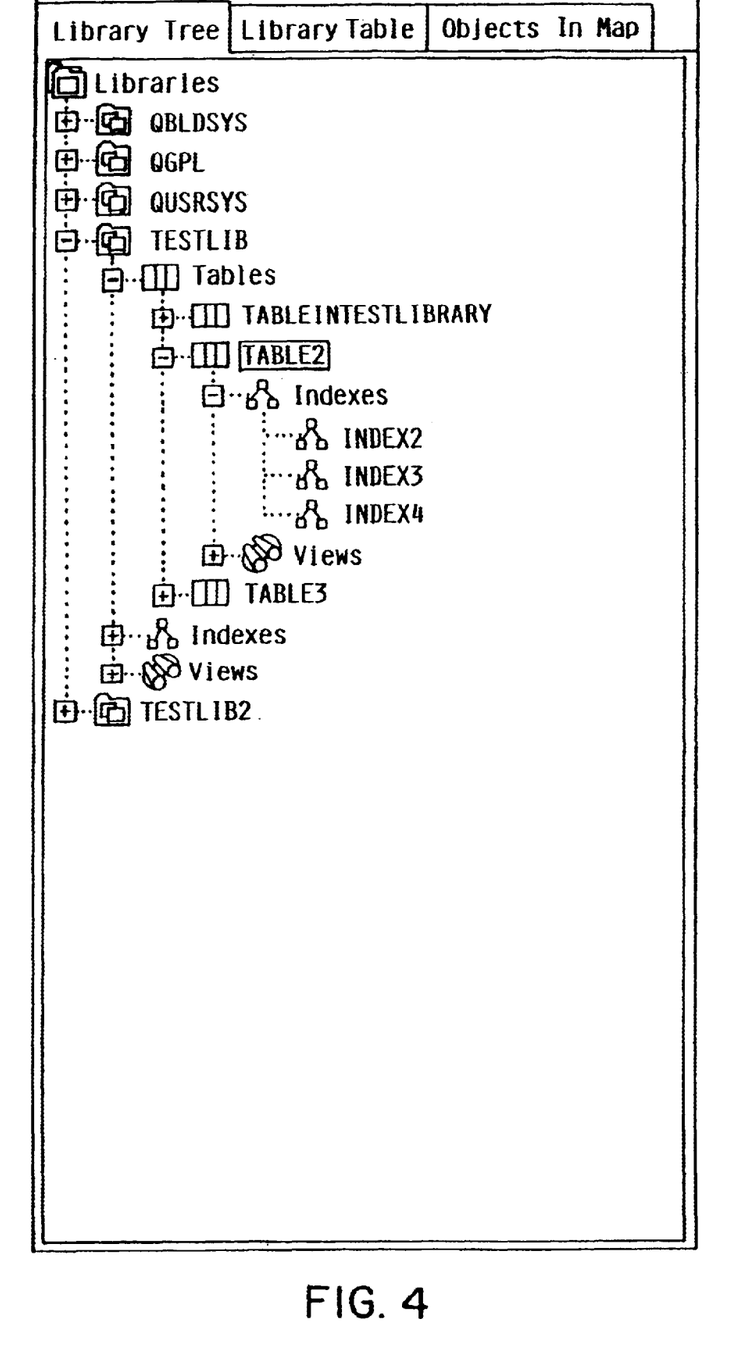

In FIG. 4, the Indexes object related to TABLE2 has been expanded in the tree and has three indexes logically related to TABLE2 displayed below it. These are: INDEX2, INDEX3, and INDEX4. The tree thus graphically shows that there is a logical relationship between the table TABLE2 and the three indexes INDEX2, INDEX3 and INDEX4, in accordance with the invention.

Figure 5:
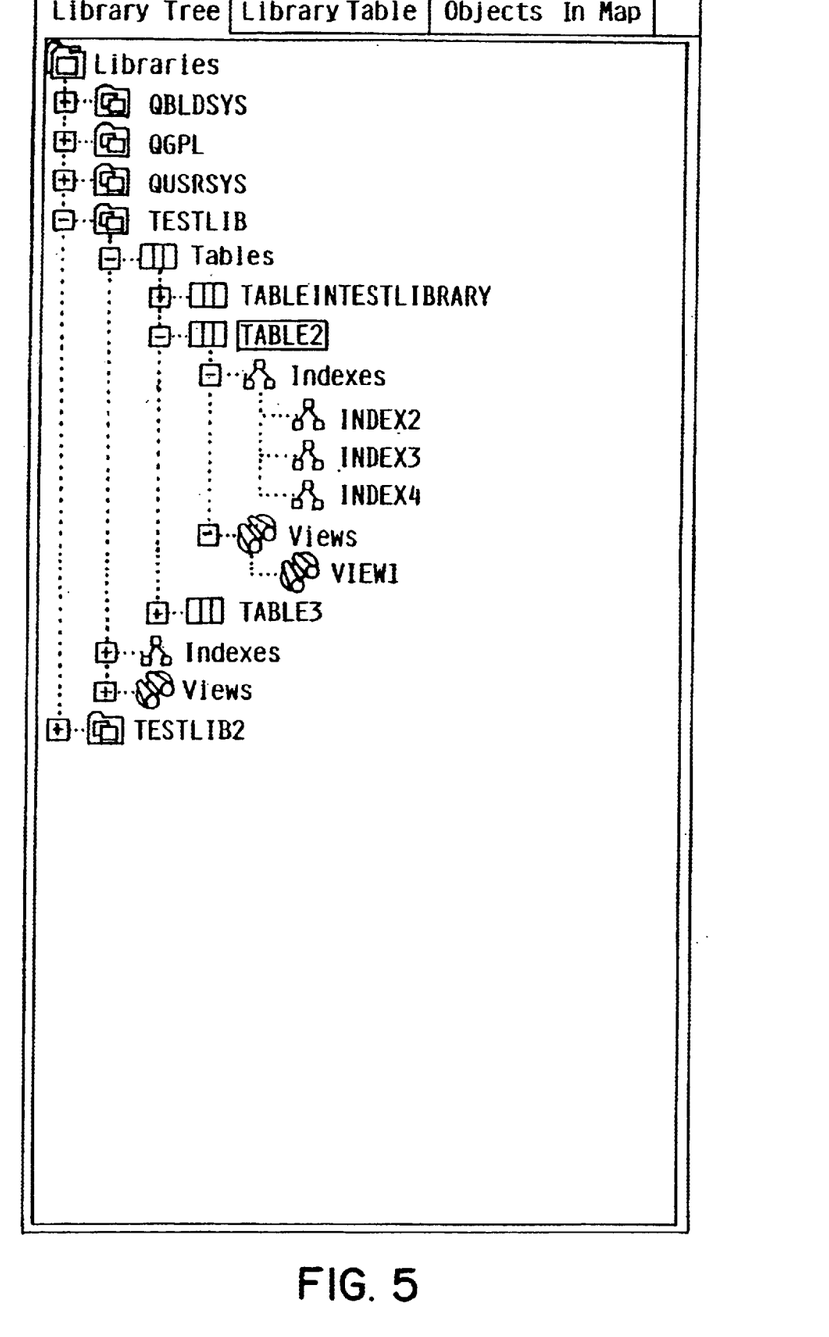
Figure 6:
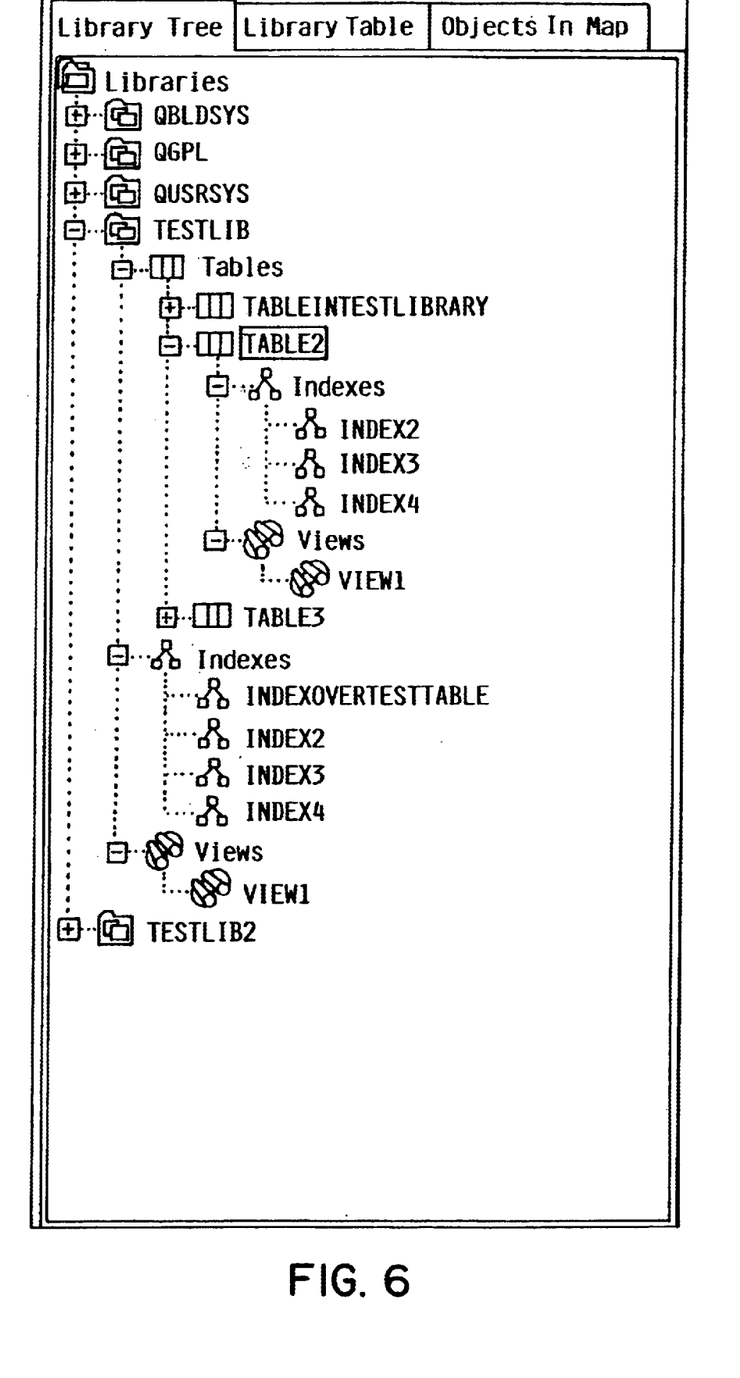

In FIG. 5, the Views object related to TABLE2 has been expanded to show that there is one view, VIEW1 logically related to TABLE2, by virtue of the way VIEW1 is shown in the tree. The tree thus graphically shows that there is a logical relationship between the table TABLE2 and the view VIEW1. FIG. 6 shows the additional expansion of the Indexes and Views containers under TESTLIB which contain the respective indexes INDEXOVERTESTTABLE, INDEX2, INDEX3 and INDEX4, and the view VIEW1.

As one skilled in the art would recognize, there are a number of modifications and variations possible within the spirit and scope of the invention. For example, some of these that are considered applicable for implementation of the invention include:

1. Expanding a table node the user would see Indexes, Views, Referential Constraints, Check Constraints, Unique Keys, Primary Keys, Triggers, Journals, Aliases.
2. Expanding a view node the user would see the Tables the view was created over and Aliases.
3. Expanding a referential constraint node the user would see the Tables created between.
4. Expanding a index node the user would see the Table which it was created.
5. Expanding a journal node the user would see all the Tables, Views or Indexes being journaled and the Journal Receivers.

Figure 7:
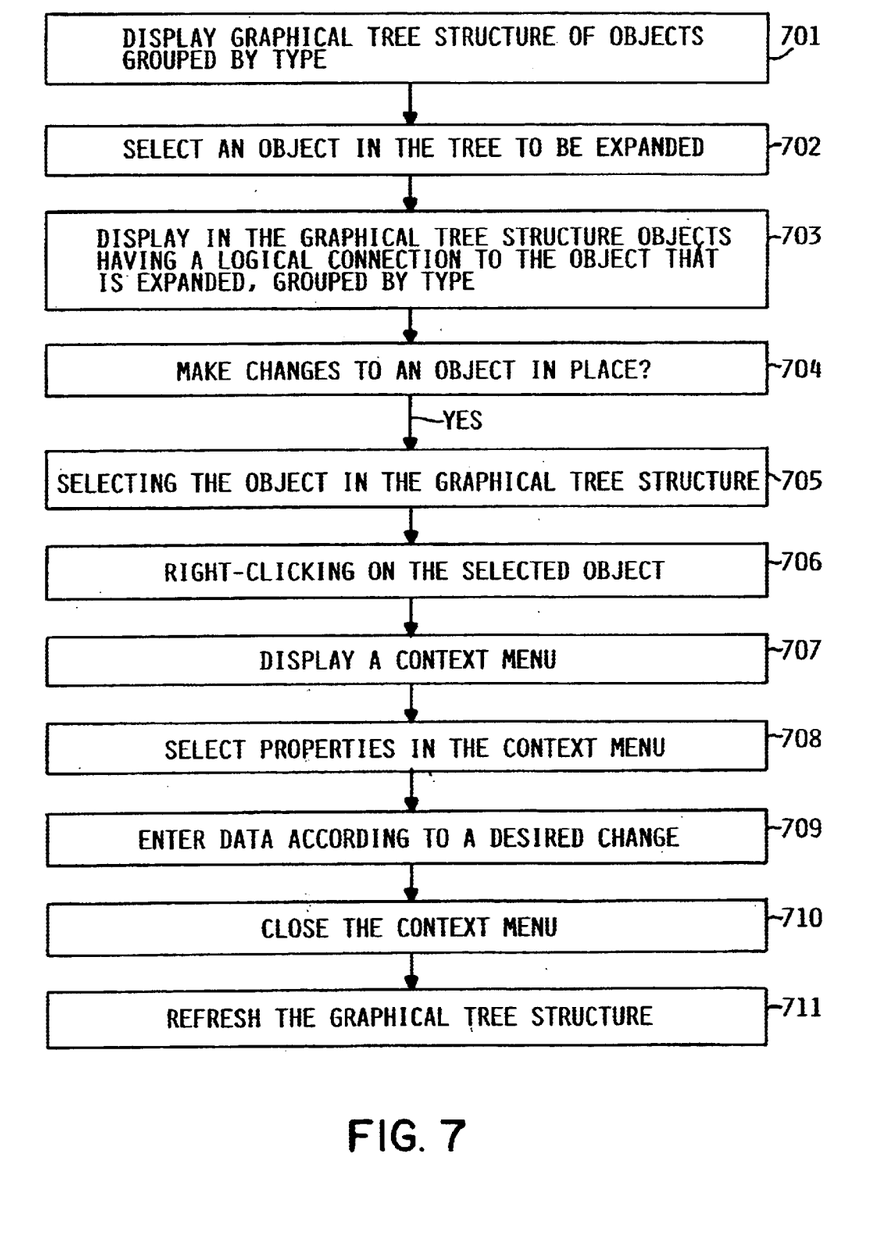
FIG. 7 is a flow chart illustrating an exemplary embodiment of a computer based method according to the invention.

FIG. 7 is a flow chart illustrating an exemplary embodiment of a computer based method according to the invention. Initially, a graphical tree structure of objects grouped by type is displayed (701). Then the user can select an object in the tree to be expanded (702). When the selected object is expanded, objects having a logical relationship or connection to the object that is expanded are displayed in the graphical tree structure, grouped by type (703). If changes are to be made to an object in place (704), then next, the user selects the object in the graphical tree structure to be changed (705), right-clicks on the selected object (706) and a context menu is displayed (707). The user then selects the properties item in the context menu (708), and enters data according to the desired change (709). Then the user closes the context menu (710) and the graphical tree structure is refreshed to show the change (711).

Figure 8:
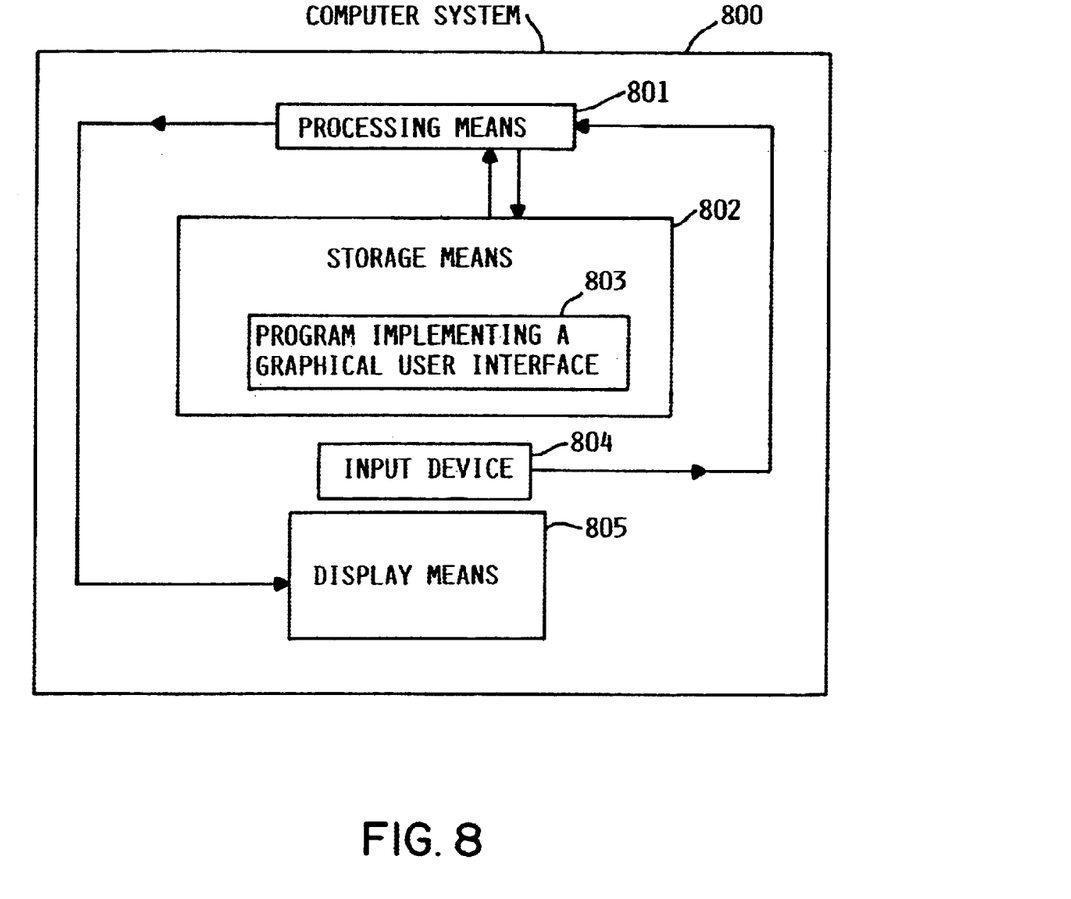
FIG. 8 is a block diagram of a computer system in which a graphical user interface is implemented according to an exemplary embodiment of the invention.

FIG. 8 is a block diagram of a basic computer system 800 in which a graphical user interface can be implemented according to an exemplary embodiment of the invention. The basic computer system 800 includes processing means 801, storage means 802 in which a program implementing a graphical user interface 803 as described above is disposed, an input device 804, e.g., mouse and/or keyboard, and a display means 805.

Database objects were used in the above exemplary embodiment to demonstrate the concept of the invention. However, the concept can be applied to any set of objects that have some sort of relations between them. For example, it could be applied to a family tree or a network of pictures. Such applications are considered to be within the spirit and scope of the invention.

The invention may be embodied as a computer program product. A computer program product includes a recording medium, such as a floppy disk, a high-capacity read only memory in the form of an optically read compact disc or CD-ROM, a tape, a transmission type media, such as a digital or analog communications link, or a similar computer program product.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. A method of documenting relations between objects using a graphical interface tree component, comprising:

displaying a graphical tree structure of objects grouped by type;

when an object in the tree is selected to be expanded by a user with a pointing device, displaying in the graphical tree structure objects having a logical connection to the object that is expanded, grouped by type, wherein the objects having a logical connection to the object that is expanded are contained in a different container from the object that is expanded.

2. The method according to claim 1, wherein the objects are parts of a data base.

3. The method according to claim 2, wherein the parts of the data base include at least three types: tables, indexes and views.

4. The method according to claim 3, wherein when a table is selected to be expanded by a user with a pointing device, indexes and views having a logical connection to the table are displayed, grouped by type.

5. The method according to claim 1, further comprising making changes to an object in place with a pointing device and a data input device by selecting the object in the graphical tree structure, right-clicking on the selected object to display a context menu, selecting properties in the context menu, entering data according to a desired change, and closing the context menu, wherein the graphical tree structure is refreshed to show the change.

6. A computer program product, comprising:

a recording medium; and instruction means, disposed on the recording medium, for causing a computer to implement the method of documenting relations between objects using a graphical interface tree component according to claim 1.

7. A computer system having processing means, storage means, a pointing device, a data input device, and display means, and operating a graphical user interface utilizing the method according to claim 1.

8. A displayed graphical interface tree component, comprising:

a displayed graphical tree structure of objects grouped by type;

wherein, an object in the tree can be expanded by a user with a pointing device, thereby displaying in the graphical tree structure, objects having a logical connection to the object that is expanded, grouped by type, wherein the objects having a logical connection to the object that is expanded are contained in a different container from the object that is expanded.

9. In a computer system having a display and having a data base application with component parts stored therein, a method of displaying and manipulating the data base comprising:

accessing logical relationships between parts of the data base; and displaying the logical relationships between parts of the data base as a graphical tree structure of objects grouped by type;

wherein, an object in the tree can be expanded by a user using a pointing device, thereby displaying in the graphical tree structure, objects having a logical connection to the object that is expanded, grouped by type, wherein the objects having a logical connection to the object that is expanded are contained in a different container from the object that is expanded.

10. The method according to claim 9, further comprising:

displaying a context menu for an object in response to a right-clicking on the object with a pointing device by a user.

11. The method according to claim 9, further comprising:

enabling a user to make changes to an object in place by selecting the object in the graphical tree structure with a pointing device, right-clicking on the selected object to display a context menu, selecting properties in the context menu, entering data according to a desired change, and closing the context menu, wherein the graphical tree structure is thereafter refreshed to show the change.

12. The method according to claim 9, wherein the parts of the data base include at least three types: tables, indexes and views.

13. The method according to claim 12, wherein when a table is selected to be expanded by a user, indexes and views having a logical connection to the table are displayed, grouped by type.

14. A computer system, comprising:

processing means for performing data processing;

storage means for storing data including objects and program instructions;

display means for displaying graphical representations to a user; and input means for inputting data;

wherein the program instructions implement a graphical user interface which causes the display of a graphical tree structure of objects grouped by type and logical relationships between objects, wherein, an object in the tree can be expanded by a user using the input means, thereby displaying in the graphical tree structure, objects having a logical connection to the object that is expanded, grouped by type, wherein the objects having a logical connection to the object that is expanded are contained in a different container firm the object that is expanded.

* * * * *